(12) United States Patent
Bacher et al.

(10) Patent No.: US 6,583,273 B1
(45) Date of Patent: Jun. 24, 2003

(54) AZO DYES, PROCESS FOR THEIR PREPARATION AND THEIR USE FOR DYEING OR PRINTING NATURAL OR SYNTHETIC MATERIALS

(75) Inventors: Jean-Pierre Bacher, Buschwiller; Jean-Marie Adam, Rosenau, both of (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/564,766

(22) Filed: May 4, 2000

(30) Foreign Application Priority Data

May 10, 1999 (EP) .............................. 99810414

(51) Int. Cl.[7] .................. C09B 29/12; C09B 67/26; D06P 1/06
(52) U.S. Cl. .................. 534/845; 534/860; 534/582; 8/527; 8/682; 8/683; 8/924
(58) Field of Search .................. 534/845, 860; 8/527, 682, 683, 924

(56) References Cited

FOREIGN PATENT DOCUMENTS

| DE | 2154298 | 8/1972 |
|---|---|---|
| GB | 1556622 | 11/1979 |

*Primary Examiner*—Fiona T. Powers
(74) *Attorney, Agent, or Firm*—Kevin T. Mansfield

(57) ABSTRACT

This invention relates to dyes of formula

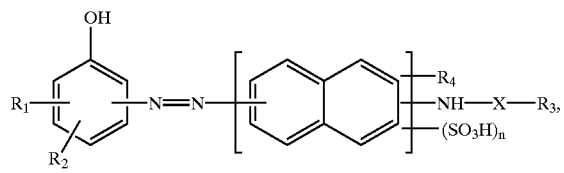

(1)

wherein $R_1$ is hydrogen, halogen, $C_1$–$C_8$alkyl, —NH—CO—$C_1$–$C_4$alkyl or phenyl, $R_2$ is hydrogen, halogen, $C_1$–$C_8$alkyl, $C_1$–$C_8$alkoxy, —NH—CO—$C_1$–$C_4$alkyl or phenyl, $R_3$ is hydrogen, $C_1$–$C_8$alkyl or phenyl, $R_4$ is hydrogen, halogen or $C_1$–$C_8$alkyl, and X is —CO—, —COO—or —SO$_2$—, and n is the number 1 or 2, to their preparation and to their use for dyeing or printing natural and synthetic materials, in particular synthetic polyamide fibre materials.

7 Claims, No Drawings

AZO DYES, PROCESS FOR THEIR PREPARATION AND THEIR USE FOR DYEING OR PRINTING NATURAL OR SYNTHETIC MATERIALS

The present invention relates to azo dyes and to their use for dyeing or printing nitrogen-containing or hydroxyl group-containing natural or synthetic materials, in particular synthetic polyamide fibre materials.

It is the object of this invention to provide yellow- or orange-dyeing dyes which are suitable for dyeing or printing nitrogen-containing or hydroxyl group-containing natural or synthetic fibre materials, in particular natural or, more preferably, synthetic polyamide fibre materials, and which have good allround fastness properties and, in particular, good lightfastness, good solubility and good printing paste stability as well as good compatibility with red and blue dyes in trichromatic dyeing processes.

It has now been found that the following dyes substantially meet these requirements.

Accordingly, this invention relates to dyes of formula (1)

[Structure showing phenol with $R_1$, $R_2$ substituents, azo bridge to naphthalene with $R_4$, $NH-X-R_3$, and $(SO_3H)_n$ substituents]

wherein $R_1$ is hydrogen, halogen, $C_1$–$C_8$alkyl, —NH—CO—$C_1$–$C_4$alkyl or phenyl, $R_2$ is hydrogen, halogen, $C_1$–$C_8$alkyl, $C_1$–$C_8$alkoxy, —NH—CO—$C_1$–$C_4$alkyl or phenyl, $R_3$ is hydrogen, $C_1$–$C_8$alkyl or phenyl, $R_4$ is hydrogen, halogen or $C_1$–$C_8$alkyl, and X is —CO—, —COO— or —SO$_2$—, and n is the number 1 or 2.

$R_1$ defined as $C_1$–$C_8$alkyl is, for example, methyl, ethyl, n-propyl, isopropyl, n-butyl, isobutyl, sec-butyl, tert-butyl, pentyl, hexyl, heptyl and octyl.

$R_2$ defined as $C_1$–$C_8$alkyl is, for example, methyl, ethyl, n-propyl, isopropyl, n-butyl, isobutyl, sec-butyl, tert-butyl, pentyl, hexyl, heptyl and octyl.

$R_3$ defined as $C_1$–$C_8$alkyl is, for example, methyl, ethyl, n-propyl, isopropyl, n-butyl, isobutyl, sec-butyl, tert-butyl, pentyl, hexyl, heptyl and octyl.

$R_4$ defined as $C_1$–$C_8$alkyl is, for example, methyl, ethyl, n-propyl, isopropyl, n-butyl, isobutyl, sec-butyl, tert-butyl, pentyl, hexyl, heptyl and octyl.

$R_2$ defined as $C_1$–$C_8$alkoxy is, for example, methoxy, ethoxy, propoxy and butoxy.

—NH—CO—$C_1$–$C_4$alkyl is preferably —NH—CO—CH$_3$ and —NH—CO—C$_2$H$_5$.

X is preferably —CO—.

$R_1$ is preferably tert-butyl and methyl.

$R_2$ is preferably —C(CH$_3$)$_2$CH$_2$CH$_3$, —C(CH$_3$)$_2$CH$_2$C(CH$_3$)$_3$ and tert-butyl.

$R_3$ is preferably ethyl and methyl.

$R_4$ is preferably methyl and hydrogen.

$R_1$ is also preferably halogen, in particular chloro.

$R_2$ is also preferably methoxy and halogen, in particular chloro.

$R_1$ is particularly preferably methyl.

$R_2$ is particularly preferably tert-butyl.

$R_3$ is particularly preferably methyl.

$R_4$ is particularly preferably hydrogen.

$R_1$ is preferably bound in ortho-position to hydroxy.

$R_2$ is preferably bound in para-position to hydroxy.

The azo bridge is preferably bound in ortho-position to the hydroxy.

—NH—X—$R_3$ is preferably bound in para-position to the azo bridge.

n is preferably the number 1.

Preferred dyes of formula (1) are those of formula (2)

[Structure showing phenol with $R_1$, $R_2$ substituents, azo bridge to benzene with $R_4$, $NH-X-R_3$, and $SO_3H$ substituents]

wherein $R_1$, $R_2$, $R_3$, $R_4$ and X have the meanings and preferred meanings given above for formula (1).

Particularly preferred dyes of formula (1) are those of formula (3)

[Structure showing phenol with $R_5$, $R_6$ substituents, azo bridge to benzene with $NH-X-R_7$ and $SO_3H$ substituents]

wherein $R_5$ is hydrogen, methyl, tert-butyl or chloro, $R_6$ is methyl, tert-butyl, —C(CH$_3$)$_2$CH$_2$CH$_3$, —C(CH$_3$)$_2$CH$_2$C(CH$_3$)$_3$, methoxy, chloro or phenyl, $R_7$ is methyl, and X is —CO—.

Very particularly preferred dyes of formula (1) are those of formulae (100)

[Structure with tert-pentyl-substituted phenol, azo bridge, and benzene ring with SO$_3$H and NHCOCH$_3$ substituents]

(101)

[Structure with methyl-substituted phenol, azo bridge, and benzene ring with SO$_3$H and NHCOCH$_3$ substituents]

(102) 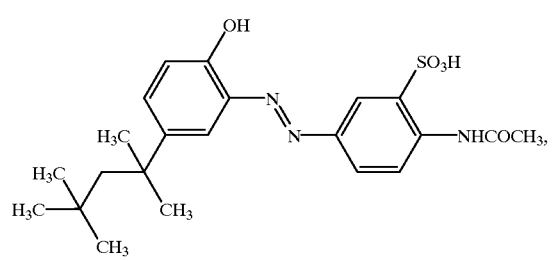
(103) 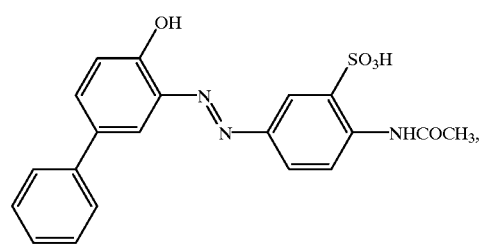
(104) 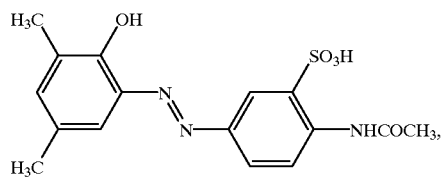
(105) 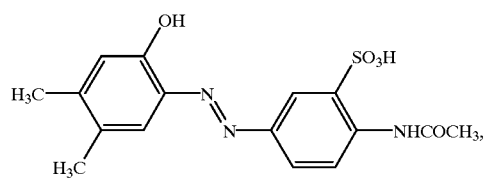
(106) 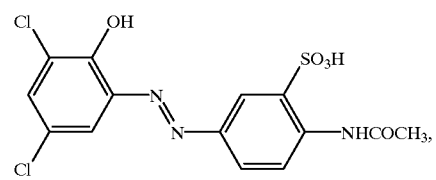
(107) 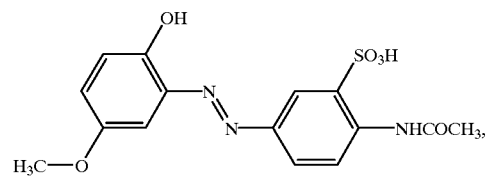
(108) 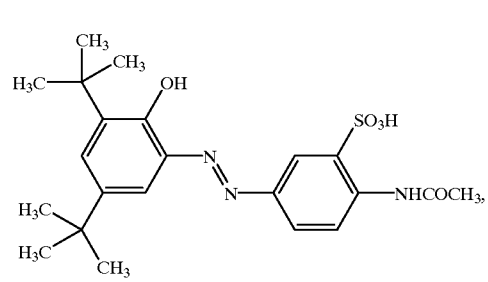
(109) 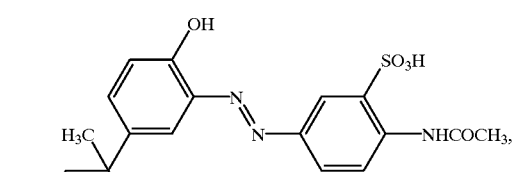
(110) 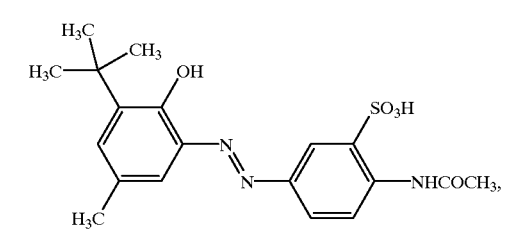
(111) 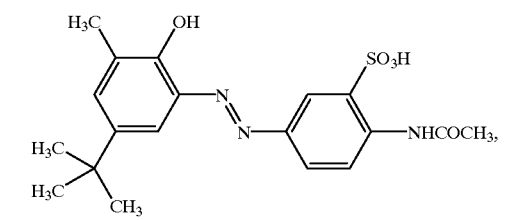
(112) 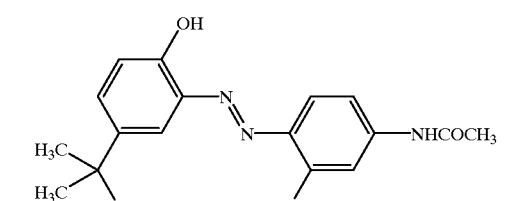
(113) 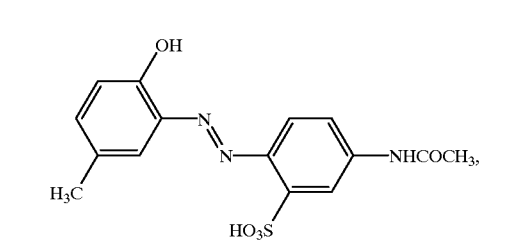
(114) 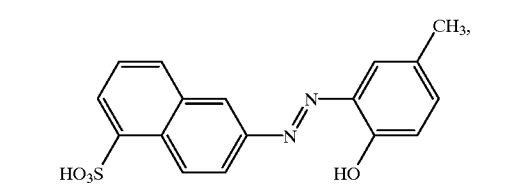
(115) 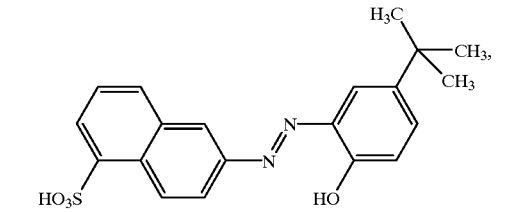

-continued (116)

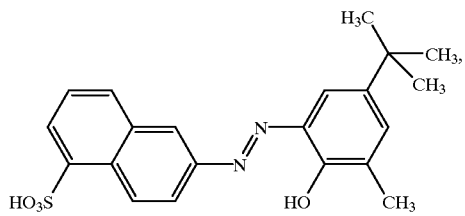

(117)

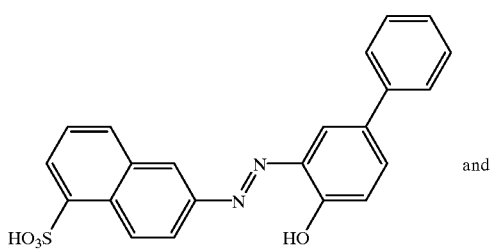
and (118)

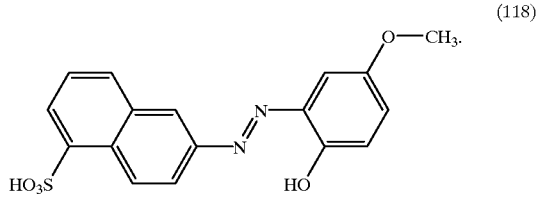

Of the dyes listed above, the dye of formula (111) is particularly important.

The dyes of formulae (1), (2) and (3) can be used as free acid or, preferably, in the form of salts, for example in the form of the Li—, Na—, K—, $NH_4$—, triethanolamine or triisopropanolamine salts, or as salts containing a cation which is obtained by reacting triethanolamine with ethylene oxide and/or propylene oxide.

The dyes of formulae (1) and (2) can be obtained, for example, by diazotising the compound of formula (50)

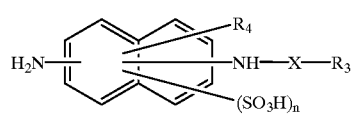

or of formula (51)

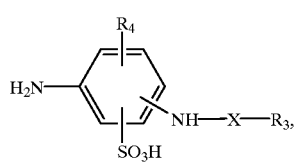

wherein $R_3$, $R_4$ and X have the meanings given for formula (1) in the acid pH range and then reacting the diazonium compound so obtained with a compound of formula (52)

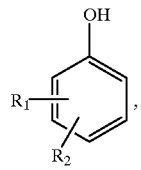

wherein $R_1$ and $R_2$ have the meanings given for formula (1), and with an aqueous sodium hydroxide solution at a pH in the range from 8 to 12, advantageously from 9.5 to 10.5.

The compounds of formulae (50) to (52) are known or can be prepared by methods generally known per se.

Another object of this invention are concentrated aqueous dye solutions, which comprise 5 to 50% by weight, preferably 10 to 50% by weight and, more preferably, 20 to 50% by weight, based on the entire weight of the solution, of a dye of formula (1). The dyes can be present in these concentrated aqueous solutions either in the form of free acids or in the form of the salts described above.

The novel concentrated aqueous solutions can contain further additives, for example urea, caprolactam or polyethylene glycol. The novel concentrated aqueous solutions may also contain substances inhibiting the growth of fungi and/or bacteria. The novel dye solutions furthermore have good resistance to hard water and can be diluted with water in any ratio, for example when preparing the dye liquor, without the dissolved dyes precipitating.

The novel dyes of formula (1) can be used in the customary dyeing and printing processes. In addition to water and the dyes, the dye liquors or printing pastes can also contain further additives, for example wetting agents, antifoams, leveling agents or agents influencing the properties of the textile material, for example softeners, additives for flame retarding finishing or dirt, water and oil repellents, as well as water softeners and natural or synthetic thickeners, such as alginates and cellulose ether.

The novel dyes of formula (1) are also suitable for dyeing from short liquors, for example in the continuous dyeing process or in the discontinuous and continuous foam dyeing processes.

The novel dyes of formula (1) are particularly distinguished by good take-up, good solubility, good stability of the printing paste as well as good compatibility. Furthermore, the novel dye solutions have good storage stability, their concentrated solutions, for example, being storage-stable for several months at temperatures from −5 to +40° C.

Level dyeings are obtained which have good allround fastness properties, in particular good fastness to rubbing, wetting, wet rubbing and light.

The novel dyes of formula (1) are particularly suitable for dyeing or printing hydroxyl group-containing or nitrogen-containing fibre materials. They are particularly suitable for dyeing or printing synthetic polyamide materials, for example polyamide 6 or polyamide 6,6, or silk, and they are also suitable for dyeing or printing blended fabrics or yarns of wool and synthetic polyamide. The cited material, in particular textile material, can be in any form of presentation, for example in the form of fibres, yarn, wovens or knitgoods and, in particular, in the form of carpets.

The following Examples illustrate the invention in more detail. Temperatures are given in degrees Celsius and parts and percentages are by weight, unless otherwise stated. The ratio of parts by weight to parts by volume is the same as that of the gramme to the cubic centimetre.

EXAMPLE 1

5 Parts of 4-aminoacetanilide-2-sulfonic acid (91.5%) are added to 50 parts of 1 N hydrochloric acid at 10° C. 5 Parts of a 4 N aqueous sodium nitrite solution are added dropwise to the slightly violet suspension over 10 minutes and this mixture is stirred for 2 hours at 5 to 10° C.

The suspension so obtained is added over 30 minutes at 20–25° C. to a solution consisting of 3 parts of 4-tert-butylphenol, 10 parts of an aqueous 2N sodium hydroxide solution and 150 parts of water. During the addition, the pH is kept at 10 by adding an aqueous, 2 N sodium hydroxide solution. The resulting yellow suspension is stirred for 2 hours at 20–25° C. and at pH 10 and is then filtered. The product is washed with 100 parts of water and dried under vacuum at 70° C. yielding 7.1 parts of a compound of formula

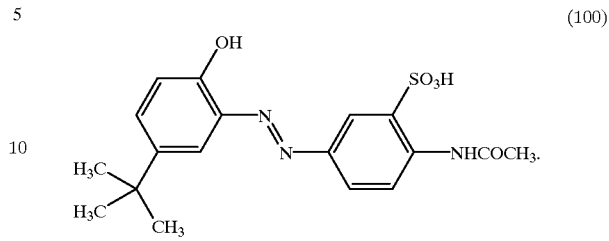

(100)

The compounds listed in the following Table 1 can be prepared in analogous manner:

TABLE 1

| Working Example No. | Compound | Formula | Shade |
|---|---|---|---|
| 2 | | (101) | pale yellow |
| 3 | | (102) | pale yellow |
| 4 | | (103) | yellow |
| 5 | | (104) | yellow |
| 6 | | (105) | pale yellow |

TABLE 1-continued

| Working Example No. | Compound | Formula | Shade |
|---|---|---|---|
| 7 | 3,5-dichloro-2-hydroxyphenyl-azo / 2-acetamido-5-sulfophenyl | (106) | orange |
| 8 | 2-hydroxy-5-methoxyphenyl-azo / 2-acetamido-5-sulfophenyl | (107) | orange |
| 9 | 3,5-di-tert-butyl-2-hydroxyphenyl-azo / 2-acetamido-5-sulfophenyl | (108) | yellow |
| 10 | 2-hydroxy-5-(tert-amyl)phenyl-azo / 2-acetamido-5-sulfophenyl | (109) | pale yellow |
| 11 | 3-tert-butyl-2-hydroxy-5-methylphenyl-azo / 2-acetamido-5-sulfophenyl | (110) | yellow |
| 12 | 5-tert-butyl-2-hydroxy-3-methylphenyl-azo / 2-acetamido-5-sulfophenyl | (111) | pale yellow |

EXAMPLE 13

The procedure of Example 1 is repeated, but replacing 5 parts of 4-aminoacetanilide-2-sulfonic acid with an equimolar amount of 4-aminoacetanilide-3-sulfonic acid, to give the compound of formula

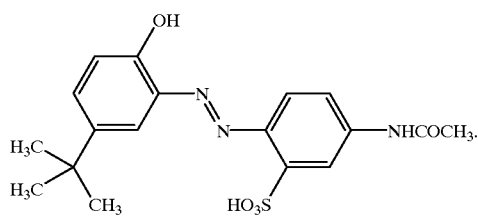

(112)

EXAMPLE 14

The procedure of Example 1 is repeated, but replacing 5 parts of 4-aminoacetanilide-2-sulfonic acid with an equimolar amount of 4-aminoacetanilide-3-sulfonic acid and replacing 3 parts of 4-tert-butylphenol with an equimolar amount of p-cresol to give the compound of formula

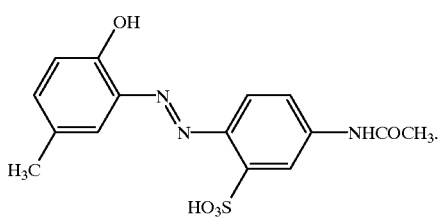

(113)

EXAMPLE 15

5 Parts of 2-amino-5-naphthalenesulfonic acid (95.5%) are placed in 50 parts of 1 N hydrochloric acid at 10° C. 5 Parts of a 4 N aqueous sodium nitrite solution are added dropwise to the slightly violet suspension over 10 minutes. This mixture is stirred for 2 hours at 5 to 10° C. The suspension so obtained is added over 30 minutes at 20–25° C. to a solution consisting of 3 parts of 4-tert-butylphenol, 10 parts of an aqueous 2N sodium hydroxide solution and 150 parts of water. During the addition the pH is kept at 10 by addition of an aqueous 2 N sodium hydroxide solution. The resulting yellow suspension is stirred for 2 hours at 20–25° C. and at pH 10 and is then filtered. The product is washed with 100 parts of water and dried under vacuum at 70° C. yielding 7.1 parts of a compound of formula

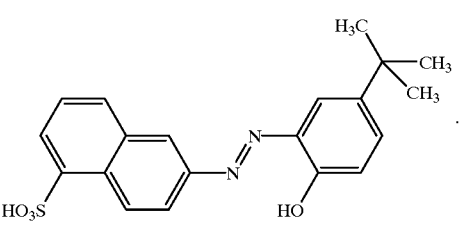

(115)

The compounds listed in the following Table 2 can be prepared in analogous manner:

TABLE 2

| Working Example No. | Compound | Formula | Shade |
|---|---|---|---|
| 16 | ![compound 114] | (114) | yellow |
| 17 | ![compound 116] | (116) | yellow |

TABLE 2-continued

| Working Example No. | Compound | Formula | Shade |
|---|---|---|---|
| 18 | 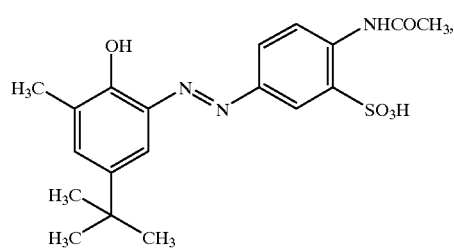 | (117) | yellow |
| 19 | 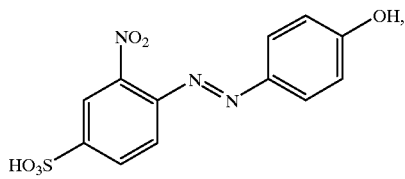 | (118) | reddish yellow |

DYEING EXAMPLE 1

1 Part by weight of a leveling agent (based on the condensate of a higher aliphatic amine ethylene oxide) is added to 2000 parts by weight of demineralised water at room temperature. The bath is then adjusted to pH 6 with 4 parts by weight of sodium dihydrogen phosphate and 0.6 part by weight of disodium hydrogen phosphate. To this bath are then added 0.10 part by weight of the dye of Example 12 which, in the form of the free acid, responds to the compound of formula (111)

0.06 part of a dye which, in the form of the free acid, corresponds to the compound of formula (114)

0.02 part of a dye which, in the form of the free acid, corresponds to the compound of formula (115)

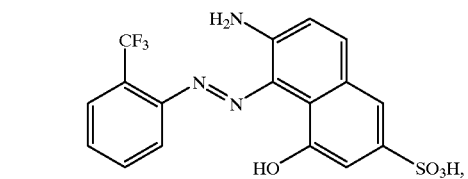

0.04 part of a dye which, in the form of the free acid, corresponds to the compound of formula (116)

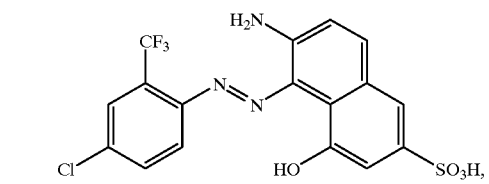

0.03 part of a dye which, in the form of the free acid, corresponds to the compound of formula (117)

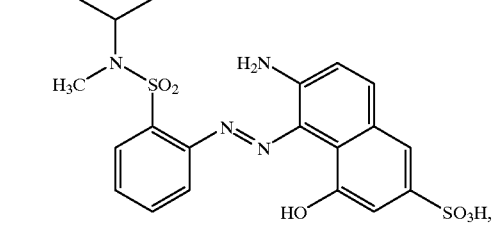

and
0.13 part of a dye which, in the form of the free acid, corresponds to the compound of formula (118)

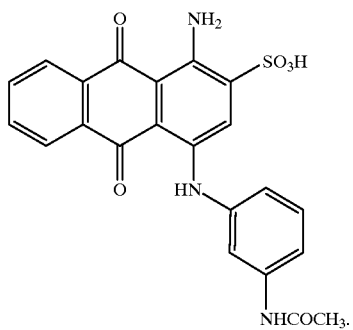

The dye solution so obtained is then charged with 100 parts of polyamide-6,6 fibre material (helanca tricot) and the dye bath is then heated over 45 minutes to about 96° C. After keeping the bath at this temperature for 45 to 60 minutes, it is cooled to 70° C. The dyed goods are then taken out, rinsed with water and dried, resulting in a fabric dyed in a beige-brown shade.

DYEING EXAMPLE 2

1 Part by weight of a leveling agent (based on the condensate of a higher aliphatic amine and ethylene oxide) is added to 2000 parts by weight of demineralised water at room temperature. Subsequently, the bath is adjusted to pH 6 with 4 parts by weight of sodium dihydrogen phosphate and 0.6 part by weight of disodium hydrogen phosphate. To this bath are then added 0.60 part by weight of the dye of Example 12 which, in the form of the free acid, corresponds to the compound of formula (111)

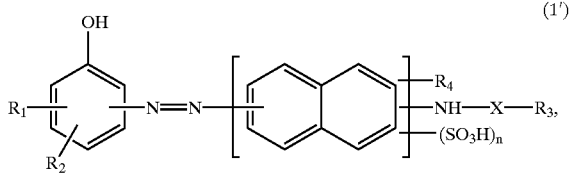

The dye solution so obtained is then charged with 100 parts of polyamide-6,6 fibre material (helanca tricot) and the dye bath is heated over 45 minutes to about 96° C. After keeping the bath at this temperature for 45 to 60 minutes, it is cooled to 70° C. The dyed goods are taken out of the bath, rinsed with water and dried, resulting in a fabric dyed in a lemon yellow shade.

What is claimed is:

1. A dye of formula (1′)

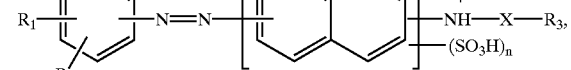

wherein $R_1$ is hydrogen, halogen, $C_1$–$C_8$alkyl, —NH—CO—$C_1$–$C_4$alkyl or phenyl, $R_2$ is hydrogen, halogen, $C_1$–$C_8$alkyl, $C_1$–$C_8$alkoxy, —NH—CO—$C_1$–$C_4$alkyl or phenyl, $R_3$ is hydrogen, $C_1$–$C_8$alkyl or phenyl, $R_4$ is hydrogen, halogen or $C_1$–$C_8$alkyl, and X is —CO—, —COO— or —SO$_2$—, and n is the number 1 or 2, or of formula (2)

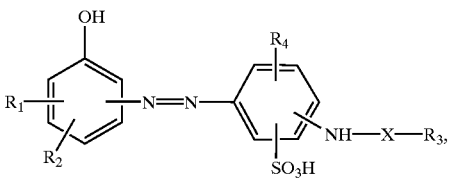

wherein $R_1$, $R_2$, $R_3$, $R_4$ and X are as defined above and —NH—X—$R_3$ is bound in the para-position to the azo bridge.

2. A dye according to claim 1 of formula (3)

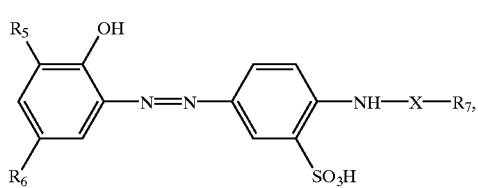

wherein $R_5$ is hydrogen, methyl, tert-butyl or chloro, $R_6$ is methyl, tert-butyl, —C(CH$_3$)$_2$CH$_2$CH$_3$, —C(CH$_3$)$_2$CH$_2$C(CH$_3$)$_3$, methoxy, chloro or phenyl, $R_7$ is methyl, and X is —CO—.

3. A dye according to claim 1 of formula (111)

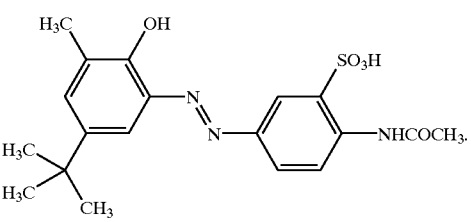

4. A concentrated aqueous dye solution, which comprises 5 to 50% by weight, based on the total weight of the solution, of a dye of formula (1)

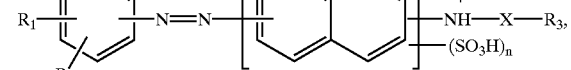

wherein

R$_1$ is hydrogen, halogen, C$_1$–C$_8$alkyl, —NH—CO—C$_1$–C$_4$alkyl or phenyl, R$_2$ is hydrogen, halogen, C$_1$–C$_8$alkyl, C$_1$–C$_8$alkoxy, —NH—CO—C$_1$–C$_4$alkyl or phenyl, R$_3$ is hydrogen, C$_1$–C$_8$alkyl or phenyl, R$_4$ is hydrogen, halogen or C$_1$–C$_8$alkyl, and X is —CO—, —COO— or —SO$_2$—, and n is the number 1 or 2.

5. A concentrated aqueous dye solution, which comprises 5 to 50 % by weight, based on the total weight of the solution, of a dye of formula (2) according to claim 1.

6. A process for dyeing or printing hydroxyl group-containing or nitrogen-containing fibre materials, which comprises applying thereto one or more than one dye of formula

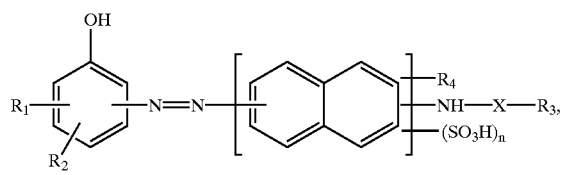

(1)

wherein
R$_1$ is hydrogen, halogen, C$_1$–C$_8$alkyl, —NH—CO—C$_1$–C$_4$alkyl or phenyl,
R$_2$ is hydrogen, halogen, C$_1$–C$_8$alkyl, C$_1$–C$_8$alkoxy, —NH—CO—C$_1$–C$_4$alkyl or phenyl,
R$_3$ is hydrogen, C$_1$–C$_8$alkyl or phenyl,
R$_4$ is hydrogen, halogen or C$_1$–C$_8$alkyl, and
X is —CO—, —COO— or —SO$_2$—, and
n is the number 1 or 2.

7. The hydroxyl group-containing or nitrogen-containing fibre materials which are dyed or printed by the process according to claim 6.

* * * * *